United States Patent

Bourdereau et al.

[11] 3,910,038
[45] Oct. 7, 1975

[54] AFTERBURNER FUEL INJECTION DEVICES FOR JET ENGINES

[75] Inventors: Guy Pierre Florentin Bourdereau, Melun; Andre Alphonse Mederic Leon Camboulives, Savigny-sur-Orge, both of France

[73] Assignee: Societe Nationale d'Etude et de Construction de Moteurs d'Aviation, Paris, France

[22] Filed: Apr. 26, 1974

[21] Appl. No.: 464,451

[30] Foreign Application Priority Data
Apr. 27, 1973  France .............................. 73.15347

[52] U.S. Cl. .............. 60/261; 60/39.32; 60/39.74 R
[51] Int. Cl.² ........................ F02K 3/10; F02C 7/20
[58] Field of Search ............ 60/261, 39.74 R, 39.31, 60/39.32, 270 R

[56] References Cited
UNITED STATES PATENTS

| | | | |
|---|---|---|---|
| 2,780,916 | 2/1957 | Collins | 60/39.74 X |
| 3,153,324 | 10/1964 | Meyer | 60/261 X |
| 3,210,928 | 10/1965 | Zelinski | 60/39.74 X |
| 3,269,116 | 8/1966 | Frasca et al. | 60/39.31 X |
| 3,572,733 | 3/1971 | Howald | 60/39.32 X |

Primary Examiner—William L. Freeh
Assistant Examiner—Thomas I. Ross

[57] ABSTRACT

For injecting fuel into the afterburner duct of a jet engine downstream of a central cone providing a turbine bearing and upstream of a flame holder, a circular manifold is connected by pipes to a hub to form an injection block of wheel-shaped form. This block is linked to the flame holder to permit relative movement and the hub slides in the central mounting and is supplied with fuel by a gooseneck feedpipe passing slidably through a section of the afterburner duct wall which section is displaceable axially of the duct. The arrangement reduces or eliminates thermally developed stresses particularly in the feedpipe and hence permits increase in reheat temperature.

10 Claims, 10 Drawing Figures

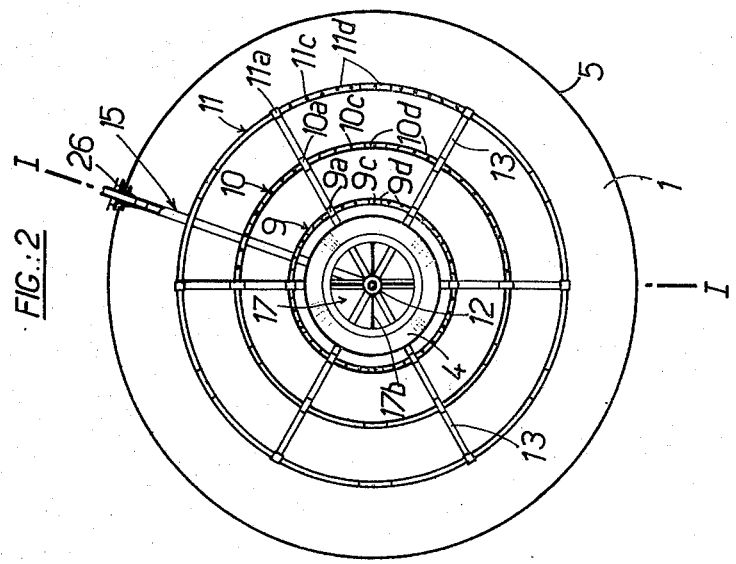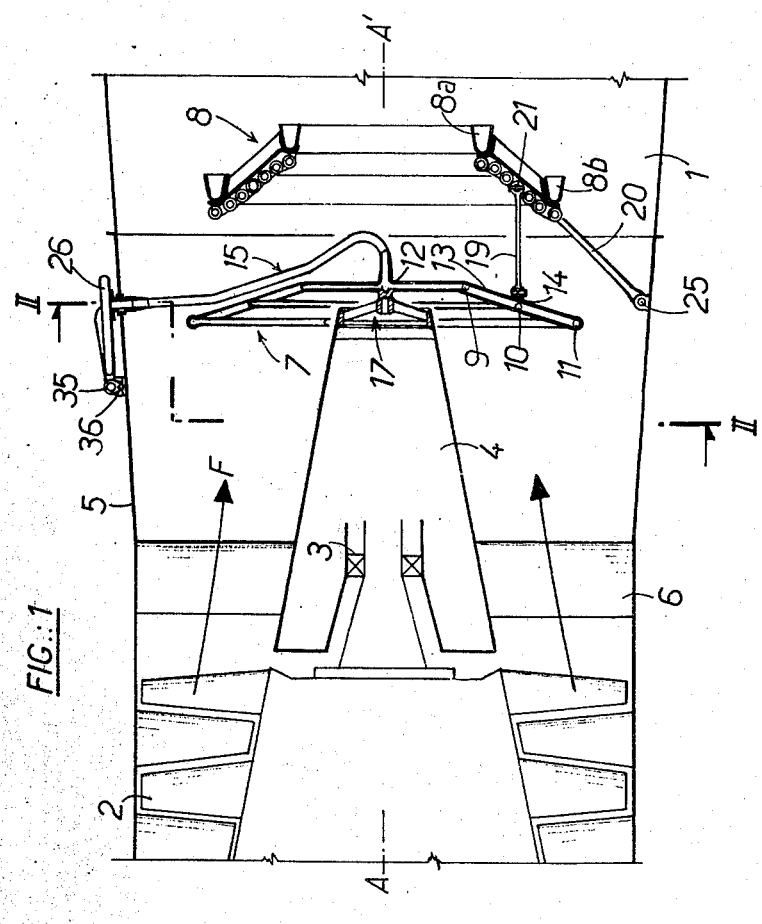

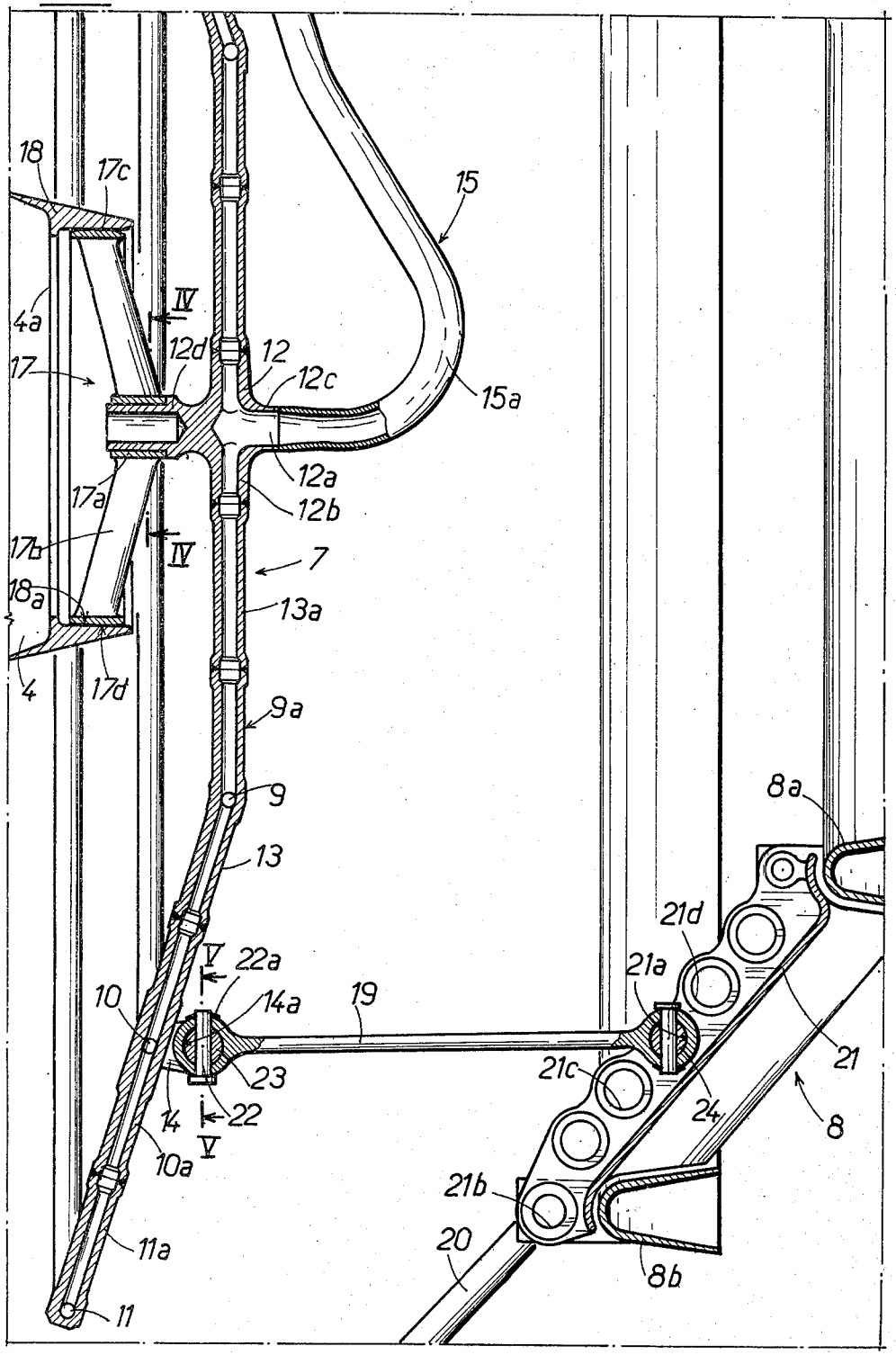

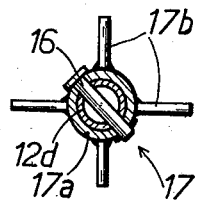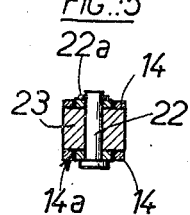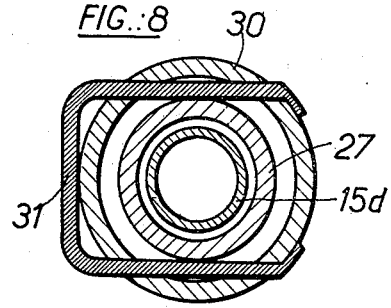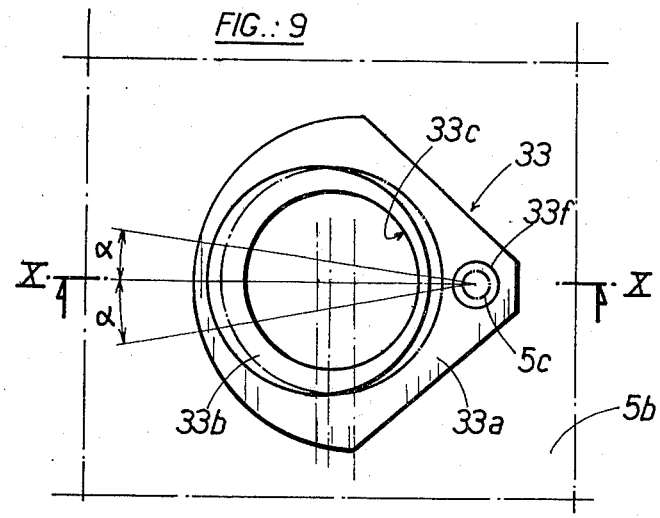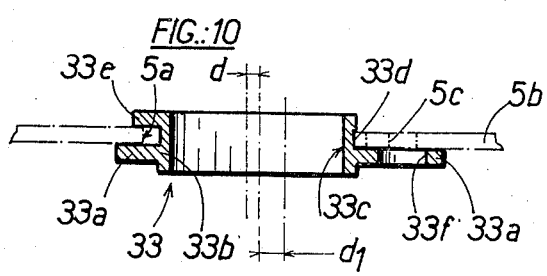

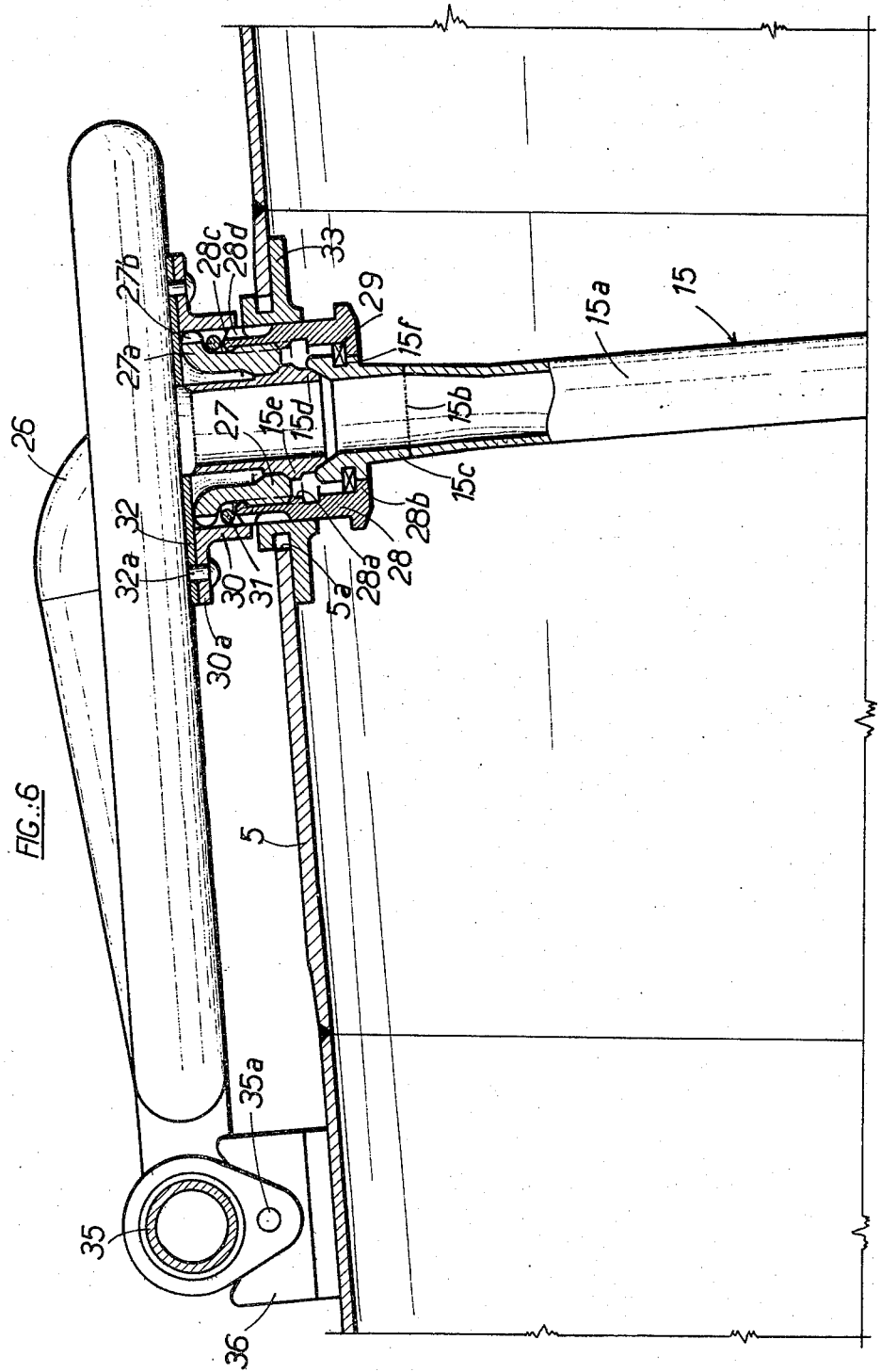

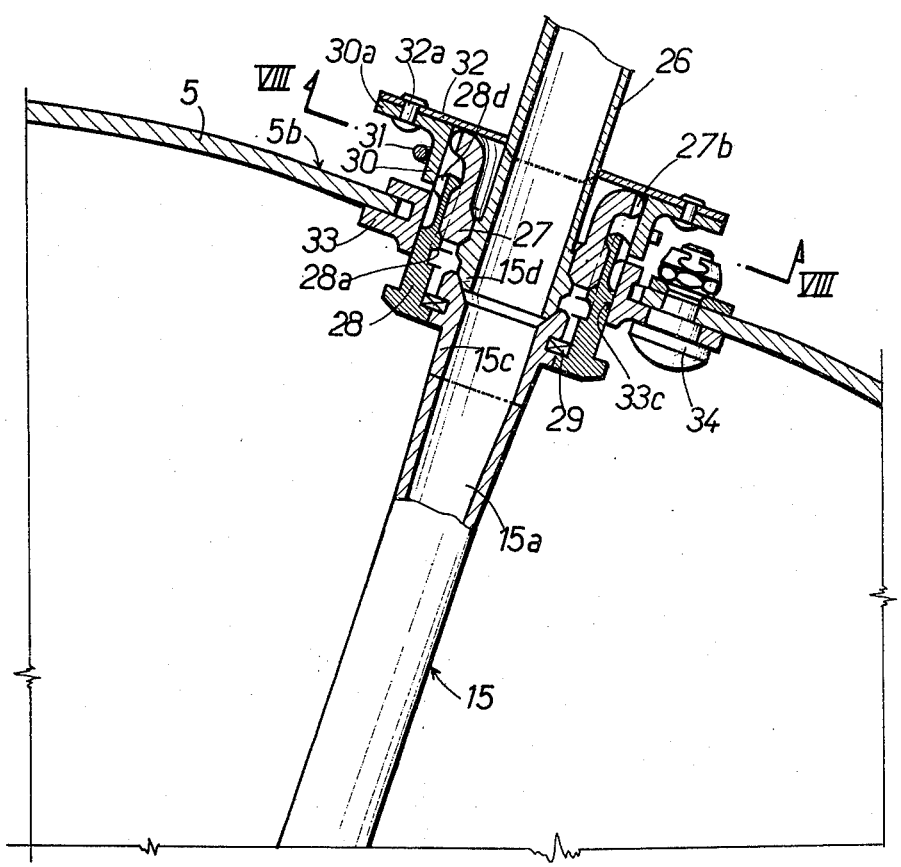

AFTERBURNER FUEL INJECTION DEVICES FOR JET ENGINES

The present invention relates to jet engines comprising an afterburner device arranged downstream of a gas turbine, of the kind used in particular for aircraft propulsion applications, and relates more particularly to the attachment and supplying of one or more fuel manifolds in the afterburner duct of a jet engine, downstream of a turbine the rear bearing of which is carried in a central mounting attached on the axis of the duct, and upstream of a flame holder fixed coaxially in the duct.

The attachment and in particular the supplying of fuel manifolds in an afterburner duct presents problems which are difficult to resolve, by reason of the very high temperatures to which they are subjected. In particular, in the known embodiments, the manifold supply pipes are subjected to stresses which make it necessary to limit the reheat temperature of the gases in the duct, despite the fact that the pipes are bent in gooseneck form as a precaution. These stresses are developed as soon as a temperature difference is created between the wall of the duct and the manifold or manifolds. When the afterburner is operating, each manifold contracts in diameter because of the cooling produced by the fuel flowing through it. When the afterburner is shut off, the whole of the injection system expands however because the manifold experiences heating of the order of 500°C due to radiation.

The present invention makes it possible in particular to reduce or even completely remove the thermally developed stresses occurring in the gooseneck pipes, so that it is possible to increase the reheat temperature.

In accordance with the present invention, at least one manifold is connected by pipes to a hub in order to form an injection block of generally wheel-shaped form, which is supported by the flame holder through articulated links, the hub being slidably assembled in the central mounting, each manifold being supplied with fuel through the pipes via the hub which is itself connected to a feed pipe of gooseneck form slidably assembled through a wall section of the afterburner duct, which section can itself undergo displacement in a substantially axial direction in relation to the duct.

Differential expansions are thus absorbed in the radial direction by the sliding motion of the pipe radially through the wall section of the afterburner duct. The sliding attachment of the central hub and the flexible coupling provided by the pivoted or articulated links between the flame-holder and each manifold, enable the latter to displace axially in the duct under the effect of temperature differentials and the duct wall section can follow this movement so that the gooseneck pipe does not experience any stressing as a consequence thereof.

The description which now follows with reference to the attached drawings, and which is given by way of non-limitative example, indicates how the invention may be put into effect. In the drawings:

FIG. 1 is a fragmentary view, in section on the line I-I of FIG. 2, of an afterburner duct equipped with an injection device in accordance with the invention;

FIG. 2 is a view in section on the line II-II of FIG. 1;

FIG. 3 is a view similar to FIG. 1, which illustrates on a larger scale the assembly of the hub of the injection device as well as the attachment, by articulated links, between that device and the flame holder and between the latter and the duct wall;

FIG. 4 is a sectional view on the line IV-IV of FIG. 3;

FIG. 5 is a sectional view on the line V-V of FIG. 3;

FIGS. 6 and 7 are detail views, respectively similar to FIGS. 1 and 2, illustrating on a still larger scale the transition of the duct wall by the pipe which supplies fuel to the injection device;

FIG. 8 is a view in section on the line VIII-VIII of FIG. 7;

FIG. 9 is a view in plan of the wall section in which the pipe can slide; and

FIG. 10 is a view in section on the line X-X of FIG. 9, showing the assembly of this wall section.

In FIG. 1, an afterburner duct 1 is shown, located downstream of the low-pressure turbine 2 of an aircraft jet engine not all of which has been depicted. The rear bearing 3 of the turbine is carried, on the axis AA' of the jet engine, in a mounting 4 known as a "central cone," which is attached to the wall 5 of the duct 1 through streamlined struts 6. The turbine 2, and the remainder of the jet engine located upstream, in a manner known per se deliver hot gases which flow in the direction of the arrows F through the duct 1 and thence into a nozzle, not shown, in order to produce a jet for the propulsion of an aircraft. In the duct 1 there is an afterburner device which is operated in order to reheat the hot gases when it is required to increase the thrust of the propulsion jet. This device comprises a fuel injection arrangement 7 arranged upstream of a flame holder assembly 8.

The injection device 7 comprises three circular manifolds 9, 10, 11 of progressively increasing diameter, assembled coaxially about a central hub 12 by means of six pipes 13 arranged at uniform angular intervals after the manner of the spokes of a wheel (see FIGS. 1 and 2). The hub 12 has an internal cavity 12a (FIG. 3) which communicates with six radially directed outlet stubs 12b to which there are respectively welded six pipes 13, each of the latter comprising a section 13a one end of which is welded to one of the connections 12b and the other end to the internal branch of a cross piece 9a with four branches, the lateral branches of which form part of the circular manifold 9. The external branch of the connector 9a is welded to the internal branch of another cross connector 10a whose lateral branches form part of the circular manifold 10, and the external branch of said latter connector 10a is in turn welded to the internal branch of a T-junction 11a the lateral branches of which form part of the manifold 11. Each of the manifolds 9, 10 and 11 is made up of pipe sections 9d, 10d, 11d curved in circular arcuate fashion and welded to one another and to the lateral branches of the connectors 9d, 10d, 11d. These pipe sections 9b, 10b, 11b contain fuel injection holes 9c, 10c, 11c (FIG. 2) which, in the illustrated embodiment, are directed downstream of the afterburner duct 1, that is to say towards the flame holder assembly 8. As FIGS. 3 and 5 show particularly well, the connectors 10a, at the downstream side, form yokes 14 the purpose of which will be indicated hereinafter, and the connectors 9a are then bent slightly in an upstream direction so that the circular manifolds 9, 10, 11 are disposed upon a hypothetical conical surface which is concave towards the upstream direction, the purpose of which arrangement will be explained hereinafter.

The hub 12 has been shown in detail in FIGS. 3 and 4. At the downstream side it is provided with a central connection 12c communicating with the cavity 12a and welded to a gooseneck pipe 15 which will be described later, whilst at the upstream side it is welded to a central sleeve 12d which is wedged into the hub 17a of a wheel-like component 17, and secured there by a pin 16 (FIG. 4). The component 17 has four arms 17b linking the hub 17a to a rim 17c whose external surface 17d takes the form of a portion of a sphere centred on the axis of the component 17. At the rear edge 4a of the mounting 4 which is referred to as the "central cone," but which has a frusto-conical shape, there is welded a sleeve 18 whose internal cylindrical surface 18a is machined to the diameter of the surface 17d. The component 17, assembled in the sleeve 18 as shown in FIGS. 1 and 3, thus forms with the latter a sliding knuckle assembly enabling the hub 12 to make small displacements along the axis AA' and to rotate about the centre of the surface 17d formed as a zone of a sphere.

The injection device 7 is furthermore connected by six links 19 to the flame holder assembly 8 which itself is attached to the wall 5 of the afterburner duct by six links 20 (see FIGS. 1 and 3). The flame holder assembly 8 comprises two conventional V-section annular flame holder members 8a, 8b which are attached to six inclined yokes 21 each of which is located behind one of the connections 10a, connected to it by a link 19 and connected to the wall 5 by a link 20. The FIGS. 3 and 5 illustrate one end of a link 19 engaged between the two flanges of a yoke 14 and attached by a pin 22, welded at 22a, to a pivot pin 23 assembled in such a fashion as to be capable of pivoting in the bores 14a of the two yoke flanges. The other end of the link 19 is similarly engaged between the two flanges of the yoke 21 and attached to a pin 24 which can pivot in a pair of bores 21a in the yoke sides. A link 20 is articulated in a similar fashion in a pair of bores 21b in the flanges of the yoke 21 and in another yoke 25 attached to the wall 5 of the afterburner duct (see FIG. 1). The yoke 21 has a whole series of pairs of bores such as those 21c and 21d. Thus, at the time of assembly of the device, it is possible to choose which pair of bores 21a, 21c, 21d receives the pin 24, thus enabling the position of the injection device 7 to be adjusted.

The pipe 15 supplies fuel to the manifolds 9, 10, 11 through the cavity 12a in the hub 12 and through the pipes 13. It comprises a pipe 15a which is welded, as already indicated, to the connection 12c. The latter is located on the axis AA' and directed downstream, so that the pipe 15a thus extends away axially downstream but curves back in gooseneck fashion and slopes in the upstream direction parallel to the hypothetical conical surface on which the injectors are arranged, then extending towards the wall 5 of the afterburner duct in a direction normal to the wall. The pipe 15 is thus kept as far away as possible from the flame holder assembly and this reduces the risk of coking of the fuel in the pipe.

FIGS. 6 to 10 illustrate how the feed pipe 15 passes through the wall 5 of the afterburner duct. At the end 15b of the pipe 15a a flared ferrule 15c is welded in place, into which there fits a nipple 15d welded to the end of the feed pipe 26 located outside the wall 5 of the afterburner duct. The connection is maintained in a sealing relationship by a threaded ring 27 bearing against a collar 15e on the nipple 15d and screwed into a thread 28a in a sleeve 28 which has an internal lip 28b bearing in the opposite direction against a pair of split washers 29 located in an annular groove 15f in the flared ferrule 15c. The top edge of the sleeve 28, the internal surface of which is threaded at 28a, externally takes the form of a bead 28c with teeth 28d, and the top edge of the threaded ring 27 has an external bead 27a also provided with teeth 27b. The teeth 27b and 28d fit in the splines provided in the internal surface of a collar 30 which is thus assembled around the ring 27 and the sleeve 28, locking them together. A U-pin 31 (FIG. 8) the two legs of which are transversely engaged in the collar 30 and pass through the annular space between it and the ring 27, beneath the bead 27a and above the bead 28c, prevents the collar from escaping, the ends of the legs of the pin 31 extending outside the collar 30 and being bent over on to its external surface so that the pin is captive. In addition, a plate 32, with a central opening for passage of the pipe 26, is attached by four rivets 32a to a flange 30a on the collar 30, thus limiting the float of the collar.

The sleeve 28 is slidably assembled in a portion 33 of the wall 5 which can execute small displacements in a circular opening 5a machined in a flat 5b on the wall 5 (FIG. 7). Wall section 33 is constituted by a machined component comprising, as shown in FIGS. 9 and 10, a flat plate having the general form of a sector 33a, with a bearing pad 33b containing a bore 33c in which the sleeve 28 can slide. The bearing pad is provided externally with a circular groove 33d coaxial with the bore 33c and having a height slightly greater than the thickness of the flat 5b on the wall 5, so that the edge of the opening 5a can engage there. The groove separates the plate 33a from a flange 33e having a circular external edge of slightly smaller diameter than that of the opening 5a and offset in relation to the bore 33c. The plate 33a contains a hole 33f enabling it to be pivotably assembled by means of a pin 34 fitted in a hole 5c in the flat 5b, the centre of which hole is located in the same plane, perpendicular to the axis AA', as the centre of the opening 5a (FIG. 7).

The component 33 should, of course, be assembled through its bore 33c on the sleeve 28, before the assembly of the latter with the ring 27 and, in order to assemble the component 33 on the wall 5, the flange 33e is engaged in the opening 5a whereafter the edge of the latter is engaged in the groove 33d by sliding the plate 33a over the flat 5b to bring the hole 33f opposite the hole 5c, that is to say, into the position shown in FIG. 10 where the bore 33c is offset by a distance d of the order of 2.5 mm in relation to the opening 5a. The pin 34 is then fitted, thus creating an assembly which enables the component 33 to pivot through an angle $\alpha$ to either side of the mean position shown in FIG. 10, that is to say to displace in a direction practically parallel to the axis AA' of the afterburner duct 1, for example through a distance of around 3 mm to either side of the mean position. In the embodiment illustrated, the plate 33 has the general shape of a sector and more specifically the form of a part-circle with an eccentricity $d_1$, of around 5 mm, in the direction of the hole 33f relatively to the bore 33c. This arrangement makes it possible to reduce to a minimum the overall dimensions of the plate and consequently the area of the flat portion 5b on the wall of the afterburner duct.

The injection device 7 thus secured in the afterburner duct 1 by the articulated links 19 and 20 and the central sliding knuckle arrangement 17d, can undergo displacement along the axis AA' and expansion in a differential fashion, without producing any stress in the gooseneck pipe 15. In other words, the displacements of the device 7 along the axis AA' are accompanied by sliding of the plate 33a over the flat 5b in a direction which, as already explained, is practically parallel to the axis AA', whilst radial expansions and contractions produce sliding of the sleeve 28 in the bore 33c. To enable this sliding motion to take place substantially without any stress, the feed pipe 26 located outside the afterburner duct has the classic curved form known as a "pretzel" shape (see FIG. 6) and is furthermore supported by a device comprising a pair of twin collars 35 pivotally assembled at 35a on a mounting 36 attached to the wall 5. The collars can pivot to a certain degree in order to accompany the movements of the plate 33, and the pipe 26 can furthermore pivot in the collars 35 in order to follow the sliding of the sleeve 28, a slight torsion being applied to the length of pipe leading from the fuel supply, when this happens.

In addition, the three manifolds 9, 10, 11 being connected and supplied through the six uniformly spaced pipes 13 which meet at the centre, each form one of six similar circular arcs each of which is supplied through both its ends. This makes it possible, unlike a conventional injection device comprising three independent circular manifolds each supplied through its own pipe, to very substantially reduce the cross-sectional areas of the manifolds and therefore their overall volume and, consequently, to increase the fuel flow velocity. This in particular yields the advantages that the manifolds are filled more quickly, afterburner ignition is speeded up, the injection of the fuel into the gas flowing through the afterburner duct is more uniform, the evacuation of the manifold when the afterburner is shut down is quicker, the mass of the device is reduced, and the risks of coking are reduced due to the fact that the fuel flows more rapidly through each manifold and therefore cools it more efficiently.

It is to be noted, furthermore, that the injection device is supplied with fuel through a single gooseneck pipe and connected to the flame holder assembly by a single ring of links, so that substantial economy is achieved in comparison with a device comprising three manifolds each attached to a fixed structure by a ring of links and each supplied through a pipe passing through the wall of the after-burner duct.

The embodiment described is by way of example and modifications are possible, in particular by the substitution of equivalent techniques or dispositions, without departing from the scope of the invention as defined in the appended claims. Specifically, the fuel feed pipe may enter the hub 12 at the upstream side instead of at the downstream side.

We claim:

1. In a jet engine comprising a turbine having a rear bearing, an afterburner duct, a central mounting fixed on the axis of said duct, means mounting the rear bearing in the central mounting, a flame holder fixed coaxially in the duct, an afterburner fuel injection arrangement comprising an injection device of generally wheel-shaped form including at least one circular manifold, a hub and pipes connecting said manifold to said hub, connecting links extending from the injection device for attachment to said flame holder and permitting movement of said hub relative to said flame holder, an aperture in the central mounting to receive the hub for relative axial slidable movement of the hub, a feedpipe of gooseneck form connected to said hub for supplying fuel by way of said hub to said manifold, and means for carrying the feedpipe through the afterburner duct wall permitting longitudinal and lateral movement of the feedpipe with respect to said duct wall.

2. A device according to claim 1, in which said pipes are radially directed and spaced at uniform angles.

3. A device according to claim 1, in which said links are articulated to the injection block at junctions between the pipes and the manifold.

4. A device according to claim 1, comprising a plurality of coaxial manifolds.

5. A device according to claim 4, in which the coaxial manifolds are arranged upon the surface of an ideal cone opening upstream, the gooseneck pipe over a portion of its length being parallel to said surface.

6. A device according to claim 1, in which the means for carrying the feedpipe through the duct wall comprises a plate covering an opening formed in a flat on said wall, and a connecting pin mounting the plate onto said flat for pivotal movement of the plate about an axis contained substantially in a same transverse plane of said duct as a middle region of the opening.

7. A device as claimed in claim 5, including a bearing pad associated with said plate, the bearing having an internal bore in which the feedpipe can slide and an external groove adapted to engage the edge of said opening and defining a flange portion which can pass freely through said opening.

8. A device as claimed in claim 7, in which said opening, said external groove and the flange portion defined by the groove are circular, the base of the groove being coaxial with the bore and the flange portion being offset.

9. In a combination in a jet engine, an afterburner duct, a central mounting fixed on the axis of the duct for carrying a turbine rear bearing, a flame holder fixed coaxially in the duct downstream of the central mounting; and, between the central mounting and the flame holder, an injection device of generally wheel-shaped form including at least one circular manifold, a hub and pipes connecting said manifold to said hub, articulated links connecting the injection device to the flame holder, means for slidably carrying the hub for axially slidable movement in the central mounting, a feedpipe of gooseneck form connected to the hub for supplying fuel to the manifold by way of said pipes, and means for passing the feedpipe through the afterburner duct wall including a duct wall portion displaceable substantially axially of the duct and a throughway in said duct wall portion for the feedpipe permitting sliding movement of the feedpipe.

10. In a jet engine comprising a gas turbine (2) having a rear bearing (3), a duct wall (5) forming an afterburner duct (1) for receiving hot gas discharged from the turbine, a central mounting assembly (4) in the afterburner duct, means (6) supporting the central mounting assembly coaxially in the duct wall, means supporting said rear bearing in the central mounting assembly, a flame holder assembly (8), and means (20) supporting the flame holder assembly coaxially in the afterburner duct downstream of the central mounting assembly;

an afterburner fuel injection arrangement comprising:

an injection device (7) of generally wheel-shaped form including at least one circular manifold (9), a hollow hub (12), and a plurality of spoke-like pipes (13) connecting said circular manifold to said hollow hub;

a sliding knuckle connection between the injection device and the central mounting assembly, including a connecting member (17) having a part-spherical peripheral surface (17d), means (16) fastening the connecting member to the hub integrally, and an axially extending sleeve (18) in the central mounting assembly for receiving said peripheral surface slidingly;

a plurality of connecting links (19) each having an upstream end and a downstream end;

means connecting said upstream and downstream ends pivotally to the injection device and to the flame holder assembly, respectively;

and means for feeding the injection device with fuel, including a feed pipe of gooseneck form having an upstream end connected to the hollow hub and an inlet end extending substantially radially adjacent an opening (5a) in a flat portion (5b) of the duct wall, a plate section (33a) covering said opening, means for supplying fuel to said inlet end and incorporating joint means (15d, 27, 28), means fastening the joint means to said inlet end, a bore (33c) in the plate section for receiving the joint means slidingly, and a connecting pin (34) located laterally of said bore, for mounting the plate section onto said flat portion for pivotal movement of the plate section.

* * * * *